United States Patent [19]

Ogiwara

[11] 4,280,935

[45] Jul. 28, 1981

[54] FRICTION MATERIAL COMPRISING AN IRON POWDER HAVING A CARBON CONTENT OF FROM 0.5–1 PERCENT

[75] Inventor: Osao Ogiwara, Hanyu, Japan

[73] Assignee: Akebono Brake Industry Company, Ltd., Tokyo, Japan

[21] Appl. No.: 71,765

[22] Filed: Aug. 31, 1979

[30] Foreign Application Priority Data

May 28, 1979 [JP] Japan .................................. 54-65752
May 28, 1979 [JP] Japan .................................. 54-65753

[51] Int. Cl.$^3$ .................... F16D 69/02; C08L 61/04
[52] U.S. Cl. .................................. 260/3; 51/298; 51/299; 51/308; 51/309; 106/36; 106/290; 106/303; 106/304; 188/73.1; 188/251 A; 192/107 M; 260/998.13; 260/38; 260/37 M; 260/9; 428/217; 428/409
[58] Field of Search ............... 106/36, 290, 304, 303; 51/298, 299, 308, 309; 428/409, 217; 188/73.1, 251 A; 192/107 M; 260/998.13, 3, 9, 38, 37 M

[56] References Cited

U.S. PATENT DOCUMENTS

| | | | |
|---|---|---|---|
| 3,663,497 | 5/1972 | Ninomiya et al. | 106/36 |
| 3,835,118 | 9/1974 | Rhee | 106/36 |
| 3,959,194 | 5/1976 | Adelmann | 106/36 |
| 3,972,394 | 8/1976 | Jacko | 106/36 |
| 4,051,097 | 9/1977 | Aldrich | 106/36 |
| 4,137,214 | 1/1979 | Sochalski | 106/36 |
| 4,175,070 | 11/1979 | Klein | 106/36 |
| 4,178,278 | 12/1979 | Reynolds | 106/36 |

*Primary Examiner*—James C. Cannon
*Attorney, Agent, or Firm*—Armstrong, Nikaido, Marmelstein & Kubovcik

[57] ABSTRACT

A friction material of the present invention is directed to secure a required value of an initial effect and the following effects after a friction hysteresis during a brake operation by adding 20–60 wt. % of a high carbon iron powder instead of a ceramic powder in the conventional friction material and also succeed in improving a wear resistance at a high temperature by further adding 0.5–10.5 wt. % of antimony trioxide as a flame retarding material.

5 Claims, 4 Drawing Figures

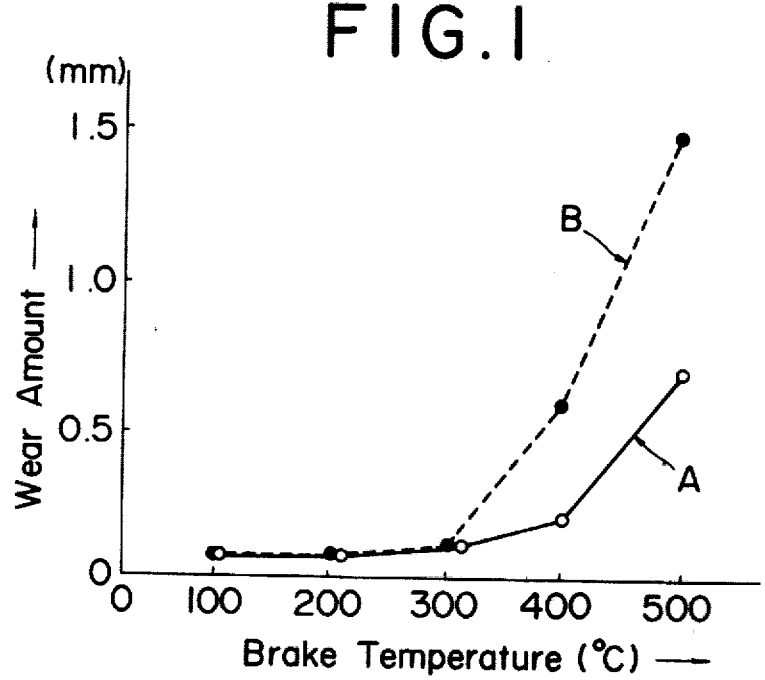
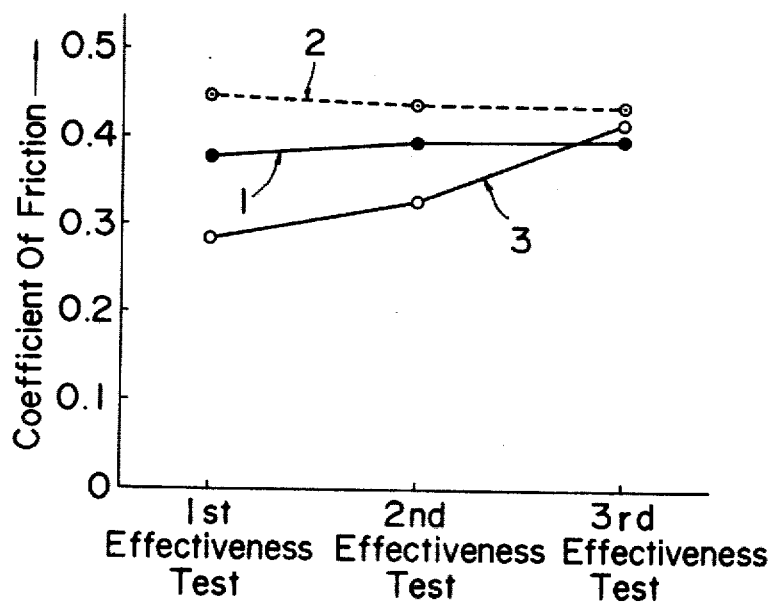

FRICTION MATERIAL COMPRISING AN IRON POWDER HAVING A CARBON CONTENT OF FROM 0.5–1 PERCENT

BRIEF DESCRIPTION OF DRAWING

FIG. 1 indicates a graph for a wear amount of an invented product and a conventional product according to a brake temperature.

FIG. 2 indicates a relationship between a coefficient of friction and each effectiveness test in connection with Embodiment 1 and 2 products of the present invention and the conventional product.

DETAILED DESCRIPTION OF THE INVENTION

Figure 3:
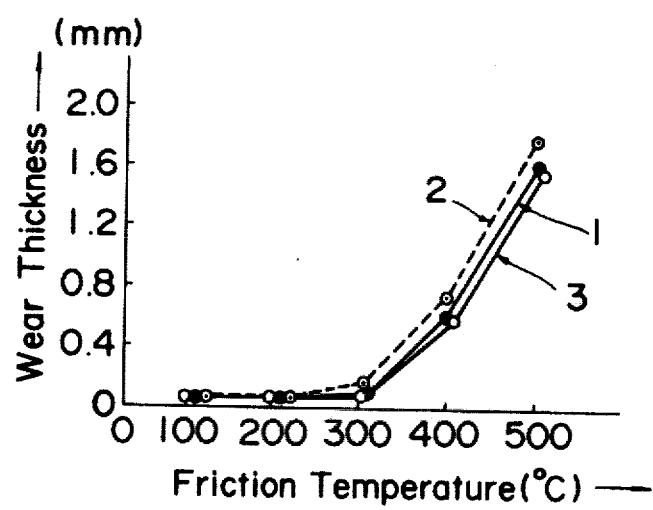
FIG. 3 indicates a graph for a wear amount according to a friction temperature in connection with Embodiment 1 and 2 products of the present invention and the conventional product.

The present invention relates to an improvement of a friction material for automobiles used for a brake shoe lining material of drum brakes and a friction pad material of disc brakes, particularly a friction material of enhancing a coefficient of friction and a stability so as to reduce a generation of a brake noise and further excelling in a wear resistance.

The conventional friction materials for automobiles have generally been the organic friction materials composed of a mixture of organic binder, asbestos fiber and friction modifier.

In the organic friction materials, the organic binder in a thermosetting resin and the asbestos fiber is to be in a sufficient length of serving as a reinforcing material for the friction material. The asbestos fiber still retains the reinforcing effect even after being affected by a temperature variation of 400° C. but reduces a strength thereof by discharging a water of crystallization gradually with a temperature hysteresis of more than 400° C. and loses the reinforcing effect entirely by discharging the water of crystallization almost with a temperature of more than 550° C.

Therefore, in case of the organic friction material containing the asbestos fiber as a reinforcing material being used for the friction material in the automobiles, the friction material has been conspicuously reduced in a wear resistance after being affected by a heat hysteresis of more than 400° C. with a braking friction heat and increased in a wear abruptly.

Accordingly, in order to overcome the above drawback, a fiber being better in a stability at a high temperature than the asbestos has been demanded and a friction material for brakes of employing a steel fiber as a reinforcing material has been recently developed.

The components of the friction material are graphite, sponge iron powder, metal powder, rubber dust, steel fiber, ceramic powder, phenol resin, etc.

It is a friction material having excellent effects of conspicuously reducing a wear amount at more than the temperature of 400° C. in comparison with a wear due to destruction of the organic friction material owing to the formation of a lubricating film due to the graphite and the reinforcement due to the steel fiber and securing a coefficient of friction owing to the ceramic powder, sponge iron powder and metal powder, and stabilizing a friction surface owing to the rubber dust.

However, as a relationship between a brake temperature and a wear amount indicated in FIG. 1, the conventional friction material (B) still has a drawback of being conspicuously increased in a wear amount at more than the temperature of 300° C. although it does not result in a wear due to destruction as in the organic friction material.

Furthermore, the conventional semi-metallic friction material contains a large quantity of graphite which results in a lower coefficient of friction at an initial use or a lower initial effect when a new product of the friction material is initially used.

If an additive amount of ceramic powder is increased in order to improve the initial effect, a grinding resistance of the ceramic powder may enhance the coefficient of friction but may grind the opposite material such as a drum or a rotor with a result of making a sliding surface thereof coarse such that the coarse condition of the sliding surface causes a vibration between the friction material and the opposite material and in turn the vibration may resonate with various parts of a brake, vehicle elements, etc. so as to cause brake noises with a problem of spoiling a comfortable driving.

Further, the grinding of the opposite material owing to the ceramic powder makes the sliding surface coarse with a result of increasing the coefficient of friction and the coefficient of friction changes with an increase in a number of brake application or as a friction hysteresis goes on with a problem of becoming instable.

In other words, there is a relationship in which a less graphite improves an initial effect but reduces a wear resistance with increasing a wear while an addition of ceramic powder improves an initial effect but increases brakes noises with a variation of a coefficient of friction.

The present invention is directed to solve these problems and proposes a friction material consisted of a mixture of 20–60 wt.% of a high carbon iron powder containing 0.5–1.0 wt.% of carbon as an inorganic friction friction modifier, 0–20 wt.% of a rubber particle and/or a cashew dust as an organic friction modifier, 10–40 wt.% of a lubricant such as graphite, molybdenum disulfide, etc., 0–10 wt.% of a metal powder such as copper, zinc, brass, aluminum, etc., 5–30 wt.% of a metal fiber and/or other inorganic fiber as a reinforcing material being excellent in a stability at a high temperature and 5–15 wt.% of a thermosetting resin, the mixture being formed by a heating with pressure, to attain an expected result.

In other words, the present invention not only secures a required value of the initial effectiveness and the effectiveness after the friction hysteresis by adding the high carbon iron powder containing 0.5–1.0 wt.% of carbon instead of the ceramic powder in the conventional friction material but also succeeds in improving the wear resistance at a high temperature by further adding 0.5–10.5 wt.% of antimony trioxide ($Sb_2O_3$) as a flame retarding material.

Accordingly, the present invention prevents the coarse surface phenomenon of the opposite material incurred by addition of the conventional ceramic powder and further effectively reduces the generation of the brake noises the variation of the coefficient of friction.

Further, the present invention does not necessitate to improve the initial effectiveness by controlling the additive amount of the lubricant such as graphite, molybdenum disulfide, etc. but enhances the wear resistance, particularly at a high temperature in cooperation with the addition of the metal fiber or other inorganic fiber as a reinforcing material which is excellent in a stability at a high temperature.

In addition, there are steel fiber, brass fiber, etc. as the metal fiber and the fibers of glass, alminosilicate, silicon, etc. are preferable as the other inorganic fiber.

The high carbon iron powder is formed in such a manner that an iron ore or a mill scale, or a mixture thereof is reduced by heating under pressure under existence of a coke and a lime and further continuously heated to carburize up to 0.5-1.0 wt.% of carbon content, and then cooled and pulverized.

The sponge iron powder added to the conventional friction material is produced by reducing with heating a magnetite powder, carbon, coke and lime being placed in a laminated structure in a kiln and by pulverizing the product in 20-80 meshes, and called "an ore reduction iron powder" which contains 0.01 wt.% of carbon content in a reduced amount.

The details and advantages of the invention will be apparent from the following description of the embodiments with the accompanying drawings.

EMBODIMENT 1

The composition of Table 1 is mixed by stirring and weighed at a certain amount and then formed by heating under pressure in a certain metal mold according to the usual way in order to obtain a product.

The high carbon iron powder of the Table 1 is formed in such a manner that an iron ore or a mill scale, or a mixture thereof is reduced by heating under existence of a coke and a lime and further continuously heated to carburize up to 0.5-1.0 wt.% of carbon content, and then cooled and pulverized.

EMBODIMENT 2

As indicated in Table 1, a cashew particle (a polymerized particle of a cashew oil shell liquid) is further added to the composition of the Embodiment 1. The composition is in a same manner as the Embodiment 1 is mixed by stirring and weighed at a certain amount and then formed by heating under pressure in a certain metal mold according to the usual way in order to obtain a product.

Besides, a typical composition of the conventional friction material is indicated as a reference.

TABLE 1

| Composition (weight part) | Embodiment 1 | Embodiment 2 | Conventional product |
|---|---|---|---|
| Phenol thermosetting resins | 8 | 8 | 8 |
| Metal powder | 1 | 1 | 1 |
| Iron powder | 0 | 0 | 42 |
| Rubber particle | 2 | 2 | 2 |
| Graphite | 17 | 17 | 17 |
| Cashew particle | 0 | 5 | 0 |
| Steel fiber | 20 | 20 | 20 |
| Ceramic | 0 | 0 | 10 |
| High carbon iron powder (KIP-A) | 42 | 42 | 0 |

For the purpose of clarifying an effect of the friction material of the present invention, a characteristic comparative test was conducted on the friction material (1) of the Embodiment 1, the friction material (2) of the Embodiment 2 and the conventional friction material (3) by a dynamometer with results of FIGS. 2 and 3.

The FIG. 2 indicates test results of the friction materials (1), (2) and (3) on a coefficient of friction in 1st effectiveness test, 2nd effectiveness test and 3rd effectiveness test which were measured on each specimen fitted on a disc brake by means of a dynamometer (JASO C 406PA) and a relationship among them.

The FIG. 3 indicates wear test results of the friction materials (1), (2) and (3) according to temperature which were measured by a full-size dynamometer under a condition of $V_o$ (a brake initial velocity) = 50 km/hr and N (a number of brake application) = 100, and a relationship between a wear thickness (mm) and a friction temperature (°C.).

As shown in FIG. 2, the friction material (1) of the Embodiment 1 is high in a coefficient of friction at 1st effectiveness and 2nd effectiveness test as compared to the conventional friction material (3) and maintains the coefficient of friction nearly at a certain value from the 1st effectiveness to the 3rd effectiveness test.

As seen from FIG. 2, the coefficient of friction of the friction material (2) of the Embodiment 2 is stable for a friction hysteresis as the case of the friction material (1) and higher than that of the latter. This is an effect due to the addition of the cashew particle (the polymerized particle of cashew oil shell liquid).

The conventional friction material (3) secures the coefficient of friction due to the cutting resistance of the opposite material brought about by the ceramic powder of high Mohs' hardness and therefore makes the sliding surface coarse as the number of brake application increases (the friction hysteresis goes on from the 1st effectiveness test the 3rd effectiveness test), thereby making the coefficient of friction high and instable as shown in FIG. 1.

On the other hand, the friction material of the present invention maintains a less variation of the coefficient of friction because of no employment of the ceramic powder and further maintains a high coefficient of friction from the 1st effectiveness test on account of the high carbon iron powder or the cashew particle. Furthermore, the friction material is less in an attacking property to the opposite material of making the sliding surface of the opposite material coarse such that the brake vibration caused by the coarse condition of the opposite material is prevented and the generation of the brake noises due to the resonance between the vibration and the brake parts, vehicle elements, etc. is effectively controlled.

As indicated in FIG. 3, the wear resistance of the friction materials (1) and (2) is slightly inferior in comparison with the conventional friction material (3) at more than 300° C. but is by no means inferior to the latter, and is particularly excellent in comparison with the wear due destruction of the conventional organic friction materials.

EMBODIMENT 3

The present invention further enhances a wear resistance at a high temperature by adding antimony trioxide $Sb_2O_3$ as a flame retarding material. The composition is indicated in Table 2.

TABLE 2

| Composition | Thermosetting resin | Metal powder | Rubber particle | Graphite | Steel fiber | High carbon iron powder | Antimony trioxide |
|---|---|---|---|---|---|---|---|
| Compounding (weight part) | 8 | 1 | 2 | 17 | 20 | 42 | 2 |

The composition of the Table 2 is mixed by stirring and weighed at a certain amount and then formed by heating under pressure in a certain metal mold according to the usual way in order to obtain a product.

The high carbon iron powder of the Table 2 is formed in such a manner that an iron ore or a mill scale, or a mixture thereof is reduced by heating under existence of a coke and a lime and further continuously heated to carburize up to 0.5-1.0 wt.% of carbon content, and then cooled and pulverized.

For the purpose of clarifying the additive effect of the high carbon iron powder in the Embodiment 3 of the present invention, a characteristic test was conducted by a dynamometer on a conventional friction material (C) of containing a sponge iron powder without a ceramic powder, a conventional friction material (B) of containing a sponge iron powder and a ceramic powder and the friction material (A) of the present invention. The test result is shown in FIG. 4.

The test result was obtained from the respective friction material in measuring a coefficient of friction ($\mu$) at 1st, 2nd and 3rd effectiveness tests in accordance with JASO by means of a full-size dynamometer.

Figure 4:
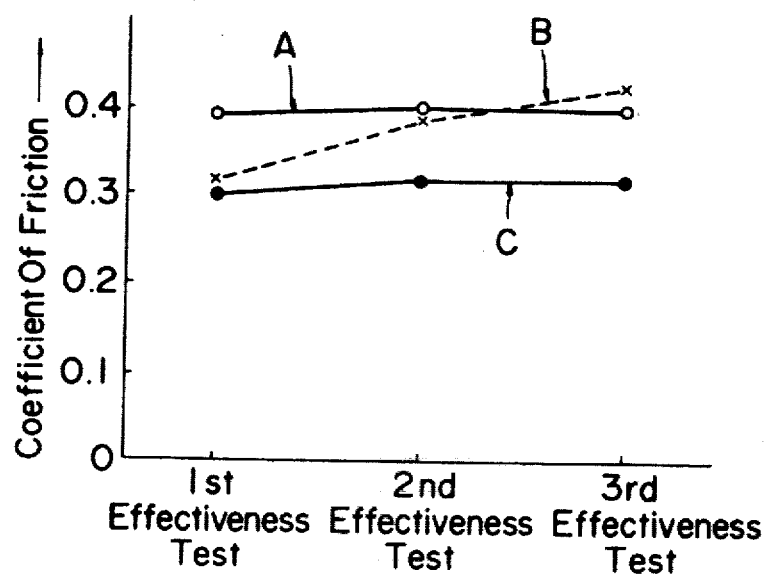
FIG. 4 indicates a relationship between a coefficient of friction and each effectiveness test in connection with Embodiment 3 of the present invention and the conventional product.

As seen from FIG. 4, the friction material (A) particularly enhances around 0.4 of the coefficient of friction ($\mu$) as compared to the conventional friction material (C) of containing the sponge iron powder, thereby realizing an excellent effect of the high carbon iron powder.

The conventional friction material (B) of containing the sponge iron powder and the ceramic powder indicates a high coefficient of friction ($\mu$) nearly equal to that of the friction material (A) of the present invention at 2nd and 3rd effectiveness test but a conspicuously low coefficient of friction at 1st effectiveness test, thereby revealing that the coefficient of friction ($\mu$) varies as the friction hysteresis goes on from the 1st effectiveness test to the 3rd effectiveness test and becomes instable.

This is because the ceramic powder added to the conventional semi-metallic friction material cuts the opposite material such that the coefficient of friction ($\mu$) increases as a coarsening of the sliding surface goes on. The coarsening phenomenon on the surface of the opposite material not only varies the coefficient of friction ($\mu$) but also increases the brake noises as mentioned above.

The relation that the addition of the ceramic powder causes the variation of the coefficient of friction is clear by the test result that the conventional friction material (C) of containing no ceramic powder maintains a stable coefficient of friction ($\mu$) at each effect point as shown in FIG. 4.

The high carbon iron powder not only renders a high coefficient of friction from the 1st effectiveness test in the Embodiment 3 of the friction material of the present invention but also contributes the maintenance of a stability of the friction material as mentioned above.

Next, for the purpose of clarifying the wear resistance of the Embodiment 3 of the friction material of the present invention, a wear amount (mm) was measured at each brake temperature. The test result of the conventional friction material (B) in comparison with the friction material (A) in the Embodiment 3 of the present invention is shown in FIG. 1.

FIG. 1 indicates a wear amount test result of the friction materials (A) and (B), the wear amount (mm) of which was measured on each specimen of the friction material fitted on a disc brake by means of a full-size dynamometer under a condition of $V_o$ (a brake initial velocity)= 50 km/h and N (a number of brake application)= 1,000 according to each brake temperature (100° C., 200° C., 300° C., 400° C. and 500° C.).

The friction material A of the Embodiment 3 of the present invention conspicuously decreases in a wear amount at more than 300° C. of the brake temperature in comparison with the conventional friction material (B) and still provides an excellent wear resistance at a high temperature more than 300° C. which reveals an excellent effect of the antimony trioxide being added as a flame retarding material.

What is claimed is:

1. A friction material wherein a mixture consisting of 20-60 wt.% of a high carbon iron powder having a carbon content of 0.5 to 1.0 wt.%, 0-20 wt.% of an organic friction modifier, 10-40 wt.% of a lubricant, 0-10 wt.% of a metallic powder, 5-30 wt.% of a fiber reinforcing material, 5-15 wt.% of a thermosetting resin and 0.5 to 10.5 wt.% of a flame retarding material is formed by heating under pressure.

2. A friction material as defined in claim 1 wherein said fiber reinforcing material consists of metal fiber, glass, aluminosilicate or silicon, or a mixture thereof.

3. A friction material as defined in claim 1 wherein said high carbon iron powder is formed in such a manner that an iron ore or a mill scale, or a mixture thereof is reduced by heating under pressure under existence of a coke and a lime and further continuously heated to carburize up to 0.5-1.0 wt.% of carbon content, and then pulverized.

4. A friction material as defined in claim 1 wherein said organic friction modifier is at least one element selected from a group consisting of a rubber particle, a cashew dust and a mixture thereof.

5. A friction material as defined in claim 1 wherein said flame retarding material is an antimony trioxide.

* * * * *